(12) United States Patent
Taneja et al.

(10) Patent No.: US 9,286,595 B2
(45) Date of Patent: Mar. 15, 2016

(54) SYSTEM AND METHOD FOR COLLECTING AND NORMALIZING ENTITLEMENT DATA WITHIN AN ENTERPRISE

(75) Inventors: Deepak Taneja, Wayland, MA (US); Prasad V. Bhamidipati, Andhra Pradesh (IN); Bushan Yadav Byragani, Quincy, MA (US); Sanjay Nadimpalli, Bangalore (IN); Joaquin Lull, Boston, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 11/833,012

(22) Filed: Aug. 2, 2007

(65) Prior Publication Data

US 2008/0052102 A1 Feb. 28, 2008

Related U.S. Application Data

(60) Provisional application No. 60/835,147, filed on Aug. 2, 2006, provisional application No. 60/835,160, filed on Aug. 2, 2006.

(51) Int. Cl.
```
G06F 15/16      (2006.01)
G06Q 10/10      (2012.01)
H04L 29/06      (2006.01)
G06Q 10/06      (2012.01)
```
(52) U.S. Cl.
CPC .............. *G06Q 10/10* (2013.01); *G06Q 10/063* (2013.01); *G06Q 10/103* (2013.01); *H04L 29/06* (2013.01)

(58) Field of Classification Search
USPC .................. 705/1, 10, 1.1–912; 709/230, 200
See application file for complete search history.

(56) References Cited

U.S. PATENT DOCUMENTS

| | | | |
|---|---|---|---|
| 5,864,871 A * | 1/1999 | Kitain et al. ............... 707/104.1 |
| 6,154,741 A * | 11/2000 | Feldman ........................ 707/9 |
| 6,195,647 B1 | 2/2001 | Martyn et al. |
| 7,380,270 B2 | 5/2008 | Tracy et al. |
| 7,877,780 B2 | 1/2011 | Kolawa et al. |
| 8,261,342 B2 | 9/2012 | Newman |
| 2002/0010768 A1* | 1/2002 | Marks et al. ................. 709/223 |
| 2002/0049627 A1* | 4/2002 | Goli et al. ...................... 705/10 |
| 2003/0009691 A1* | 1/2003 | Lyons et al. ................. 713/201 |
| 2003/0172168 A1* | 9/2003 | Mak et al. .................... 709/230 |
| 2004/0186836 A1* | 9/2004 | Schlesinger ..................... 707/9 |
| 2004/0205630 A1* | 10/2004 | Parks et al. .................. 715/526 |
| 2005/0015621 A1* | 1/2005 | Ashley et al. ................ 713/201 |
| 2008/0040610 A1* | 2/2008 | Fergusson .................... 713/182 |

OTHER PUBLICATIONS

Crosslogix: Enterprise Entitlement Management (Dec. 2001) (www.crosslogix.com).*
Adobe Acrobat: How to Create Adobe PDF Files for Print and Press Acrobat 6 (PDF 1.5) Version (Mar. 9, 2005).*

* cited by examiner

*Primary Examiner* — Jonathan Ouellette
(74) *Attorney, Agent, or Firm* — BainwoodHuang

(57) ABSTRACT

A compliance manager system automates monitoring, reporting, certification and remediation of user entitlements and roles, making it possible for organizations to easily establish a sustainable access governance model. The system enables organizations to gain enterprise-wide visibility into all user entitlements and roles and, in particular, to monitor who has access to what application, how they got access, and who approved such access. In one embodiment, a discovery and aggregation mechanism acquires identity, entitlement and role information together with associated metadata from enterprise infrastructure and applications. This information is normalized producing a unified view that is complete and correlated across users, entitlements, roles and resources.

14 Claims, 11 Drawing Sheets

FIG. 2

Edit Collector: RACF Entitlement Collector

Collector Description 1/6

| | |
|---|---|
| Collector Name* | RACF Entitlement Collector |
| Description | Periodically pulls parses and loads data that is output from a scheduled RACF report, including groups of entitlements. |
| Data Source Type* | Database |
| Agent* | AveksaAgent |
| Associated Global Role Collector | Global Role Collector |

[ < Back ] [ Next > ] [ Cancel ] [ Help ]

Edit Collector: RACF Entitlement Collector

User Attribute Evaluation 3/6

| Associated Identity Collector | User Evaluates To | |
|---|---|---|
| Unified Users | Racf Id | [x] |
| Active Directory | Email Address | [x] |
| Active Directory | User Id | [x] |

[ Add More... ]

[ < Back ] [ Next > ] [ Cancel ] [ Help ]

*FIG. 7*

| Edit Collector: RACF Entitlement Collector | |
|---|---|
| Configuration Information | 2/6 |

○ Default   ○ XML

| Driver Class* | com.hxtt.sql.text.TextDriver |
|---:|---|
| Database URL* | jdbc:csv://///home/oracle/database/SampleData/Demo |
| User Name | |
| User Password | |
| User Attributes for Attribute-Filter Validation | |
| Attribute Filter Parser Class | |
| Max Test Data Sample Records Fetch Limit | 5 |
| Max Resource Objects Cache Limit | 100 |
| Max User Entitlement Objects Cache Limit | 100 |
| Max Entitlement Bag Objects Cache Limit | 100 |
| Resource Name Column | RESOURCE |
| Resource Fully Qualified Name Column | RESOURCE |
| Action Name Column | ACTION |
| Entitlement Bag Name Column | ROLE |
| Child Entitlement Bag Name Column | |

[ < Back ]  [ Next > ]  [ Cancel ]  [ Help ]

*FIG. 5*

| | |
|---|---|
| Edit Collector: RACF Entitlement Collector | |
| Configuration Information | 2/6 |

| | |
|---|---|
| Get Resources Data Query | select DISTINCT RESOURCE, RESOURCE as FQN from RA |
| Get Resource Action Based Entitlements For Users Query | select USER RESOURCE, ACTION from RACF_Entitlement |
| Get Resource Action Based Entitlements For Group Query | |
| Get Resource Action Based Entitlements For Expressions Query | |
| Get Resource Action Based Entitlements For Attribute Filters Query | |
| Get Resource Action Based Entitlement For Roles Query | |
| Get Entitlement Bags For Users Query | select DISTINCT ROLE, USER from RACF_Role_Membersh |
| Get Entitlement Bags For Groups Query | |
| Get Entitlement Bags For Expressions Query | |
| Get Entitlement Bags For Attribute Filters Query | |
| Get Entitlement Bags for Roles Query | |
| Get Token Based Entitlements For Users Query | |

[ < Back ] [ Next > ] [ Cancel ] [ Help ]

*FIG. 6*

LOAD COLLECTOR ONE DATA INTO COMMON FORMAT

| USER | RESOURCE | OWNER | REG ID |
|---|---|---|---|
| JDOE | APPROVE PO | A@ABC | 1000456718 |
| JSMITH | HIRE | B@ABC | 1000456719 |
| CCHANG | MANAGE SAP | B@ABC | 1000456722 |

LOAD COLLECTOR TWO DATA INTO COMMON FORMAT

| RESOURCE | APPROVAL DATE | REASON | XYZ |
|---|---|---|---|
| 1000456718 | 22/07 | TRANSFER | XYZ |
| 1000456719 | 28/07 | PROMOTED | XYZ |
| 1000456722 | 30/07 | NEW HIRE | XYZ |

*FIG. 12*

| FIRST NAME | LAST NAME | TITLE | SUPERVISOR LAST NAME | APPLICATION | RESOURCE | ACTION |
|---|---|---|---|---|---|---|
| MARTIN | ADKINS | ACCOUNTS PAYABLE DIRECTOR | BENSON | GREAT PLAINS | CHECK REQUEST | SUBMIT |
| | | | | GREAT PLAINS | EXPENSE REPORT | SUBMIT |
| | | | | GREAT PLAINS | PURCHASE ORDER | REQUEST |
| | | | | PAYROLL | BONUS | REQUEST |
| | | | | PAYROLL | PAYROLL CHANGE | REQUEST |
| | | | | RACF | | READ |
| | | | | RACF | | READ |
| | | | | RACF | | READ |
| LORI | DUNCAN | ACCOUNTS RECEIVABLE DIRECTOR | | GREAT PLAINS | CHECK REQUEST | SUBMIT |
| | | | | GREAT PLAINS | EXPENSE REPORT | SUBMIT |
| | | | | GREAT PLAINS | PURCHASE ORDER | REQUEST |

*FIG. 14*

SYSTEM AND METHOD FOR COLLECTING AND NORMALIZING ENTITLEMENT DATA WITHIN AN ENTERPRISE

This application claims priority to Ser. No. 60/835,160 and 60/835,147, filed Aug. 2, 2006.

BACKGROUND OF THE INVENTION

1. Technical Field

The present invention relates generally to managing user data within an enterprise computing environment.

2. Background of the Related Art

The diversity of application and data assets across an enterprise, combined with the complexity of their related legacy, client-server, web and service-oriented architectures, poses a daunting governance and risk management challenge. Managing the security risk and regulatory risk of inappropriate access to applications and information suggests the desirability of a strategic approach to access governance, e.g., one that is based on auditable business processes that enable line-of-business managers and information security, audit and compliance teams to collaborate while ensuring accountability, transparency and visibility. This has not been feasible in the prior art, however. In particular, while security and compliance teams define policies and controls based on business requirements and regulatory mandates, it is the line-of-business managers who understand how information assets need to be used and, in particular, who should have access to them.

The prior art does not provide acceptable solutions with respect to the problem of enabling an organization to gain enterprise-wide visibility into enterprise applications having compliance-related impacts.

BRIEF SUMMARY OF THE INVENTION

A compliance manager system provides secure, automated collection of data from one or more enterprise applications, systems or infrastructure. In one embodiment, a discovery and aggregation mechanism acquires identity, entitlement and role information together with associated metadata from enterprise infrastructure and applications. This information is normalized producing a unified view that is complete and correlated across users, entitlements, roles and resources.

The compliance manager system described herein fully automates monitoring, reporting, certification and remediation of user entitlements and roles, making it possible for organizations to easily establish a sustainable access governance model. With the compliance manager system described herein, an IT security and compliance team is able to obtain enterprise-wide entitlements and roles under a consistent, automated and unified framework, while providing the necessary evidence to compliance auditors and ensuring that business managers are accountable for and enabled to make access rights decisions.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 2 is a display interface from which system users manage and create application definitions and the collectors;

FIGS. 4-7 illustrate various display panels through which a collector is provisioned;

FIG. 12 illustrates how data is translated (loaded) into the common system format;

FIG. 14 illustrates a portion of an entitlements report that is created using the described subject matter.

DETAILED DESCRIPTION OF AN ILLUSTRATIVE EMBODIMENT

Figure 1:
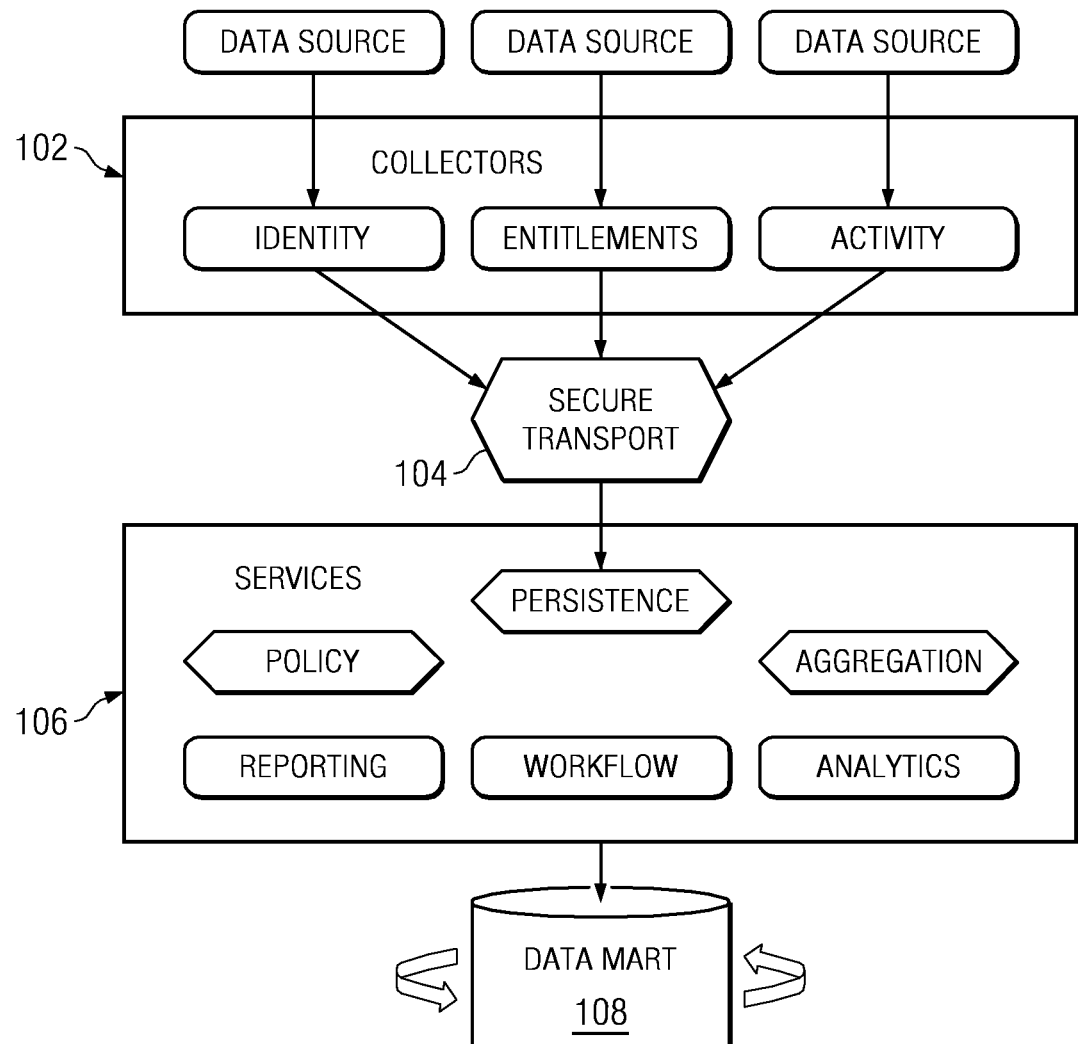
FIG. 1 is a simplified block diagram of a compliance manager system according to one embodiment.

As illustrated in FIG. 1, a compliance manager system 100 as described herein preferably comprises a number of components. In this embodiment, the system 100 comprises a set of collectors 102, a secure transport mechanism 104, a set of one or more services 106, a data mart 108, and associated workflow 110, reporting 112 and analytics 114 engines. As illustrated, the collectors 102 comprise a set of target-specific data collectors that preferably capture three types of data: identity data, entitlement data, and activity data. Each respective collector extracts data into files or records, which files or records are then securely transferred by the secure transport mechanism 104 to the one or more services 106. The services 106 typically are provided by one or more servers in (or associated with) the system. At a server, the data collected by each collector is normalized and saved to the data mart. As will be seen, the system provides automated enterprise access auditing for security management and compliance automation. It enables businesses to monitor user entitlements and activity across business processes, preferably on a continuous basis, thus creating an independent internal audit layer used for identifying and reducing risk. In a representative embodiment, the system collects, correlates and analyzes access controls, entitlements and activity data from multiple systems, applications and security infrastructure, and it enables provision of a unified, actionable business picture of "who can do what" and "who is doing what" (among other such data) in the enterprise. In general, the system reduces compliance costs, for example, by eliminating the need for time consuming manual data collection and analysis, and it improves compliance quality by establishing an automated process for verifying access controls.

The compliance manager system provides for data collection, normalization, and execution of policies using one or more of the following steps and methodology:

(a) collect identity data from all (or some subset of) user repositories in the enterprise.

(b) collect entitlement data for each application.

(c) unify all (or some subset of) users in the enterprise using last known identity data set.

(d) normalize all (or some subset of) entitlements in the enterprise (last known entitlement data set)
(e) collect activity data for each application.
(f) normalize all (or some subset of) activities in the enterprise (last known activity data set)
(g) execute all (or some subset of) entitlement policies against last known identity and entitlement data set;
(h) execute all (or some subset of) activity policies against last known identity, entitlement and activity data set.

In particular, using the above methodology, the system enables access auditing from several perspectives including security and compliance. In each such case, the system preferably delivers or enables actionable insight, e.g., in terms of a collection of reports, exceptions and statements. This insight may be delivered as a solution that is fully integrated with a customer environment. As will be described, the system preferably is built around various object types including, for example: users, business processes, application resources, user-directories, reports, statements, rules, exceptions and anomalies. The abstractions represented by these objects allow for sophisticated analyses, enable the relationships between objects to be easily understood, and ultimately enable security and compliance controls to be implemented and automated.

As noted above, a collector extracts identity, entitlement or activity data from target systems and applications. At run time, a collector obtains data with semantics and format specific to a target. For the raw data obtained from a collector to be mapped into the normalized format, typically it must be transformed and resolved to match the semantics expected by the rules and analytics engine. This transformation may require target-specific metadata that must be provided during collector development or configuration. As will be described, the data extraction and transformation required for a specific target depends on the extraction interfaces it supports and the nature of the runtime identity, entitlement and activity data it provides.

There are many ways in which the compliance manager system 100 may be implemented, and the invention is not limited to any particular one. For purposes of illustration, the subject matter herein is shown as being implemented in a distributed computer environment within a given enterprise. As noted, the invention may be implemented as a product or a service, or some combination thereof. A representative system in which the invention is implemented comprises any set of one or more computing resources including machines, processes, programs, functions, data structures, and the like. For example, one or more machines that comprise a compliance manager system may be connected to one another over a network, such as wide area network (WAN), local area network (LAN), protected network (e.g., VPN), a dedicated network, or some combination thereof. Communications among the various machines are assumed to be encrypted or otherwise protected, e.g., via SSL or the like. One or more of the machines typically are located behind an enterprise firewall. Of course, any other hardware, software, systems, devices and the like may be used. More generally, the present invention may be implemented with any collection of autonomous or other computers (together with their associated software, systems, protocols and techniques) linked by a network or networks.

In one representative embodiment, the compliance manager system is deployed as an appliance-based server (running RedHat Linux), a server-resident data mart (Oracle10g), and a set of data collectors. It provides a secure web-based interface for administration. In lieu of an appliance, the system may also be deployed on a dedicated RedHat Linux server and dedicated Oracle 10g database. Optionally, the system is deployed as a data collection appliance (or collection server) and a set of data collectors, while one or more other portions of the system are made available as a hosted application service (an ASP or managed service).

As noted above, the collectors enable the system to obtain identity, entitlement and activity data from target applications (and the directories, databases or files associated with them). In a representative embodiment, collectors run on a server or servers associated with the compliance manager system, or on one or more servers where the actual target applications in the enterprise are hosted. As also noted above, the collectors support the retrieval of various types of data: identity data (who you are), e.g., from LDAP directories, relational databases or files; entitlements (what you can access), e.g., from relational databases, LDAP directories, files and via APIs; and activity data (what you are doing), e.g., from relational databases and files. In one implementation, the collector set comprises collectors that retrieve identity data (e.g., Sun One Directory Server, Microsoft Active Directory, BEA WebLogic application server, IBM WebSphere application server, and the like), collectors that retrieve entitlement data (e.g., Microsoft .NET, Computer Associates SiteMinder, BEA WebLogic application server, IBM WebSphere application server, generic J2EE (using JBoss), and the like) and generic collectors that, if configured appropriately, can retrieve identity data from a relational database or a file, entitlement data from a relational database or a file, or activity data. The above examples are merely representative, as the subject matter herein may interoperate with many other products and systems including, without limitation, Web services management systems, XML gateways, federation gateways, wireless application platforms, digital rights management systems, file systems, databases, database auditing systems, and the like. In addition, a collector framework may be provided in the compliance manager system for the development of new collectors. This framework includes a graphical tool that allows administrators and application owners to describe the identity and entitlement related aspects of an application to assist in collector development. The tool then automatically builds an appropriate collector so that custom programming is eliminated or minimized.

Figure 2:
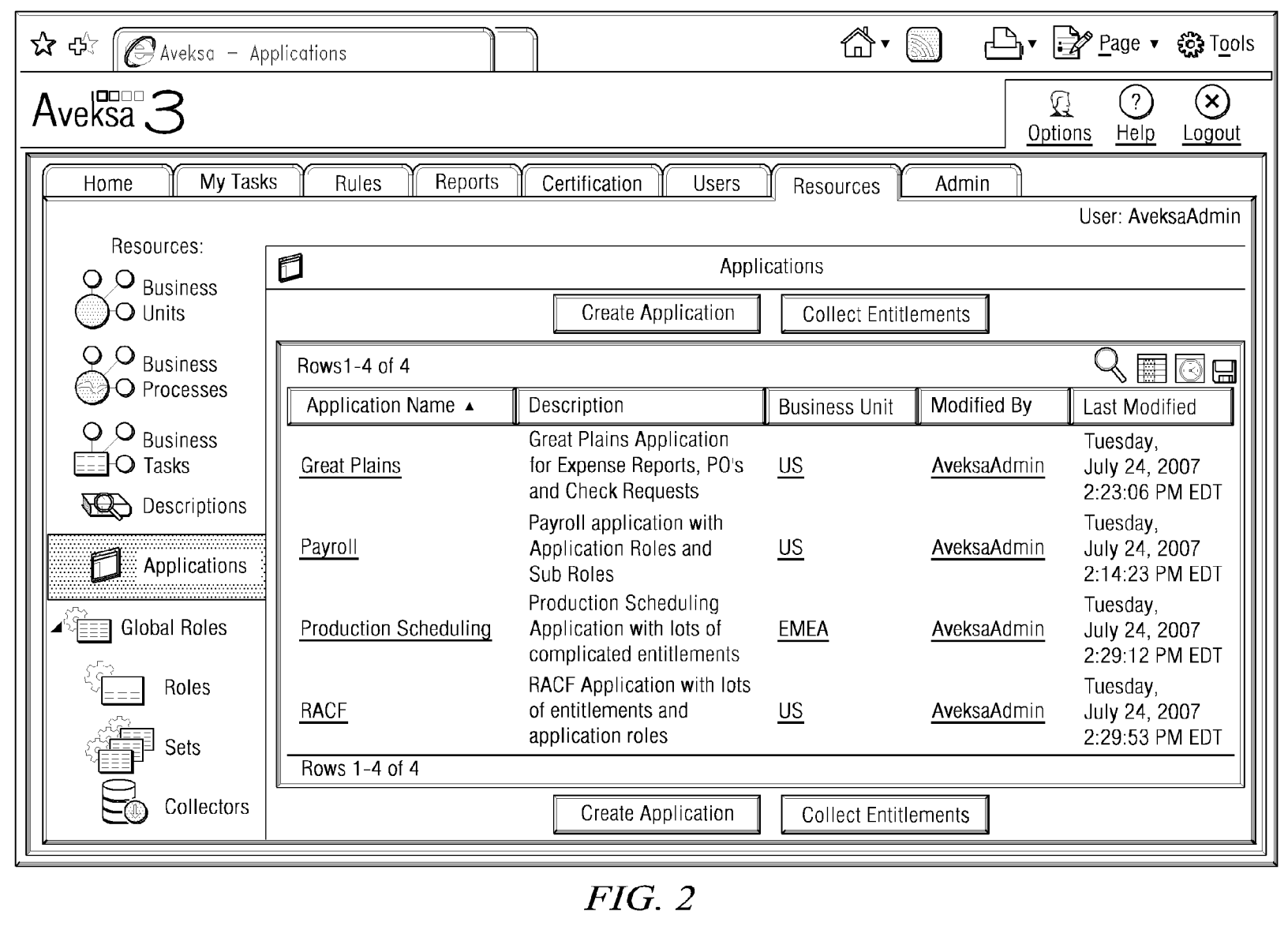

In one embodiment, the compliance manager system exports a Business Process abstraction that enables a set of related applications and data to be grouped from an analysis perspective. The system enables organizations to audit access within the context of key business processes. Each Business Process preferably comprises one or more applications implemented via a set of web servers, application servers, database servers, and the like. The system can manage applications; FIG. 2 illustrates an application management screen to facilitate this process. An application may be included in more than one Business Process. In one embodiment, the system assumes that a single individual, a Business Process Manager, is responsible for a given Business Process. This individual preferably is identified when a new Business Process is defined.

The system preferably views access-related aspects of an application from identity, entitlements and activity standpoints. While the identity-related aspects of an application typically pertain exclusively to the users interacting with the application, the notions of entitlements and activity typically include both users and the entities that the users work on. The system preferably models the entities and the user interaction with these entities in terms of resources and actions. Thus, each named application within the system preferably contains one or more resources that can be acted upon. A resource is described using one or more resource attributes, while an action is described using one or more action attributes.

As will be seen, the system creates a map of all or some of the applications (and application resources) for which collectors have been deployed, and it provides a normalized, aggregated, business-oriented view of these applications. Application resources are discovered automatically via the entitlement data collected by the collectors shown in FIG. 1. If application resources discovered via entitlement data cannot be associated automatically with specific applications, administrators are allowed to assign them to named applications. Administrators are provided with the ability to assign a set of "business" attributes to each application. These attributes characterize the business context of the application, relevant to risk and compliance management. Preferably, all resources contained within an application implicitly inherit the business attributes of the application, unless otherwise configured. One or more of the following attributes preferably are assigned for each application: "sensitivity" or business value (or "criticality" from a risk perspective); "business use" (e.g., financial reports, health records, and the like); functional ownership" typically by business unit or business function; "locality" typically by geography; "classification" of the application output; and "exception escalation interval." If exceptions are not triaged within the "exception escalation interval" for an application, they are escalated to other individuals based on the respective escalation paths for the applications. These attributes can have any value that makes sense to the user.

Because accountability often is a key issue with respect to compliance, the individuals who are responsible for each application preferably are identified to enable the system to manage exception workflow appropriately. The following individuals, therefore, should be identified: "application business owner" (the person who is responsible for the application from a business perspective and owns a subset of the business process (or the entire business process) of which the application is a part); "application technical owner" (the person who owns the technical deployment of the application and answers to the business owner); "application exceptions manager" (a person on the technical team for the application who has the task of managing application-specific exceptions generated by the system), and the like. The references preferably are to valid distinguished names (DNs) from whatever repositories are defined as delegated authentication sources. Additional application business attributes may be configured for by administrators as desired. Additional resource attributes may be configured for by administrators as desired. Resources can be assigned manually to applications as long as supporting collectors exist to provide identity, entitlements and activity data. Resources such as a file, a file folder or a database table can be created manually by administrators under appropriate "applications" (e.g. NTFS filesystem) as long as supporting collectors exist to provide identity, entitlement and activity data.

Identity Virtualization

The system preferably creates a map of all users (employees, consultants, partners, suppliers, customers) who have identities within directories shared by applications or application specific directories. This map, therefore, includes all users who have entitlements to known applications and have performed transactions on them; identities that relate to a single user are linked so that a single view of the user is available for analysis purposes. The system discovers all of the user directories through data obtained from collectors and obtains user information from the directories via LDAP, JDBC, files or directory-specific interfaces.

Because each application may use its own directory and have its own concept of user identity, the system preferably virtualizes identity so that a unified identity can be used to analyze entitlements and activity. In effect, the system creates a unified user view by correlating identities without modifying user profiles in the underlying user directories. An aspect of the virtualization capability is the concept of an "application independent" directory. These directories act as a root directory for mapping identities and as an authoritative source of key user attributes such as "location" and "department." For example, an internal Active Directory deployment could be the system-of-record directory for employees, an LDAP directory and an Oracle database could be the system-of-record directories for a customer extranet, and so forth. The system preferably provides a mechanism to define the authoritative source of any attribute from any directory of which it is aware. In certain environments, e.g., where no application independent directories exist, the system iterates through the application-specific directories and attempts to perform joins across directory profiles to unify identities to the extent possible.

In one embodiment, the system provides tools to map distinguished names (DNs) (or some other unique user identity depending on directory format) in different user directories to those in application independent directories (e.g., a universal employee number common to user profiles across multiple directories or a shared identifier (such as email address) common to user profiles between the application independent directory and other directories). This enables a searchable user space of "unified identities." Support for multiple application independent directories may also be provided.

A unified user view created by the system includes the notion of user attributes, which are business-relevant user attributes that enable security, compliance and risk-based classification. These attributes allow administrators to define user specifications that cluster users from a risk perspective, by attribute, by behavior and previous incidents. For example, attributes such as RiskScore, Administrator, OutSourcingPartner and OffShore enable user specifications for users that share a specific risk profile. The above are merely representative examples. Note that while such user attributes preferably are implemented within the system (i.e. they are not based on attributes in underlying directories), administrators may choose to cache selected user attributes and group memberships that relate to underlying directories (including application independent directories) in the unified user view. Preferably, group memberships from all underlying directories are replicated in the unified user view. By default, user attributes from underlying directories are not replicated in the unified user view; if desired, the replication of specific attributes can be configured. To ensure that cached groups and attributes are easily distinguished from each other, the compliance manager system preferably supports explicit naming for all directories leveraged in creating the unified user view. The system preferably tracks unified identities over time; hence, it has knowledge of identities that existed in the past but are no longer current, when user accounts associated with these identities appeared and when the accounts were deleted.

The compliance manager system is directory and identity aware. The unified identified can be used for several purposes, such as to analyze entitlements and activity logs, to search the aggregate user space, to visualize risk profiles (based on job function, roles, attributes, behavior, and the like), and so forth.

A unified user view is created using the information in Table 1 below:

| Term | Definition |
| --- | --- |
| Physical Directory | LDAP, Active Directory. Any user repository. |
| Logical Directory | A subset of users derived from a Physical Directory. |
| User Population (UP) | Group of Logical Directories |
| Join Condition | Expression that determines how two Directories can be joined/merged |
| User Profile/User Schema | Set of Administrator-defined attributes common to all users in the Enterprise |
| Authoritative Attribute Specification | Specification that tells us which directory serves as authoritative source for which attribute |

The following steps may be used to build an identity model. First, logical directories are defined from the physical directories. This can be accomplished by filtering on user data. Then, for each directory in the enterprise, a mapping is specified between user profile attributes and directory attributes. Logical directories are then grouped into user populations. This may be achieved by organizing related logical directories into respective groups. Preferably, each logical directory belongs to one and only one group. All users from a single group of logical directories results in a user population (UP). Thereafter, an authoritative attribute specification is used to determine which attribute from the set of directories in the UP will serve as the authoritative source for an attribute. An order of processing directories is then specified, as our various join conditions for the various directories. For example, the following rules may apply for joining directories: a directory can only be joined with another directory within the same UP; a directory can be joined with more than one directory; a directory can only be joined with a directory that precedes it in the processing order, and so forth. Once a user has been added to the enterprise user set, the user's attributes preferably are not modified unless a join occurs and the joined directory has been configured to be the authoritative source for that attribute. This ensures that the data is consistent with every collection.

Figure 3:
FIG. 3 is a display interface from which an administrator can schedule a set of one or more collectors in the system.

The following algorithm (which may be implemented in software as a set of instructions executable in a computer processor) may be used for loading data from directories and performing joins between directories:

1. For every UP in the enterprise
   1.1. Load data from first directory in the order into enterprise users table
   1.2. For directory D(2) to D(n) in the order
      1.2.1. If D(i) has join condition with any of (D(1) to D(i-1)), perform join
         1.2.1.1. If there is a match,
            1.2.1.1.1. create an alias for the user
            1.2.1.1.2. update the attributes as per authoritative specification for this UP
         1.2.1.2. If there is no match, create this user and add the user to enterprise users table
      1.2.2. If D(i) has no join condition, then create this user and add the user to enterprise users table Entitlements As noted above, preferably the collectors extract user entitlements from target applications on a periodic basis, as configured by the administrator. FIG. 3 illustrates a display interface through which an administrator schedules the collectors, including the entitlement collectors. By way of example, it is assumed that the administrator desires to configure a RACF Entitlement Collector. Upon selecting this collector in FIG. 3, the dialog screens shown in FIGS. 4-7 are displayable and used to configure the collector details. The other collectors are provisioned in a similar manner.

By way of brief background, in a typical software application, an entitlement represents a capability whose usage by application users can be controlled. Security for the application is built by granting or restricting these entitlements to application users. It is known in the art to provide products and systems to create, to record, and to manage entitlements and their grants to application users. A typical enterprise application often provides different levels of complexity in managing entitlements and their grants. For example, a given application may provide an ability to grant entitlements individually to a user, an ability to manage related entitlements (e.g., by grouping them and then allowing the grant of these groups of entitlements), an ability to grant entitlements based on a user's attributes, and so forth. The manner by which an application allows one to define and manage entitlements and their grant is sometimes referred to as an "entitlement model."

Figure 8:
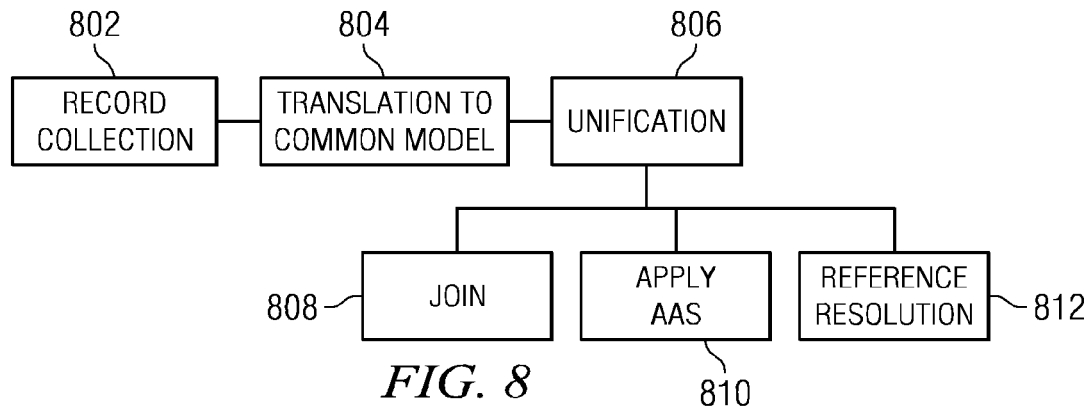
FIG. 8 illustrates an entitlement data normalization process according to a feature of the described subject matter.

According to a feature of the subject matter described herein, user entitlements from target applications in (or otherwise associated with) the enterprise are extracted, preferably on a periodic basis, and then normalized so that entitlement analysis can be done on a common model. Normalization typically comprises a set of high level steps as illustrated in FIG. 8: (i) collection of records 802, (ii) mapping of record data to a common data view 804, and (iii) unification 806. A fourth step (iv) (not shown) may include unification verification to determine if any errors occurred during the unification process. Each of the steps is now described below.

The raw data is collected from the enterprise applications at scheduled times. The collection is accomplished by the collectors. Preferably, raw entitlement data is collected by the one or more collectors as a set of records. The enterprise applications may have many types of records. The collectors typically support collecting records of the following types: resource records (these records consist of the resources in an application and their properties); resource action records (these records provide information on specific actions on resources and the properties of the resource-action tuple); application role records (these records collect application roles and their properties); user entitlement records (these records consist of a user's set of granted entitlements). The user entitlement records capture the grants and revocations of the entitlements within the application.

Figure 9:
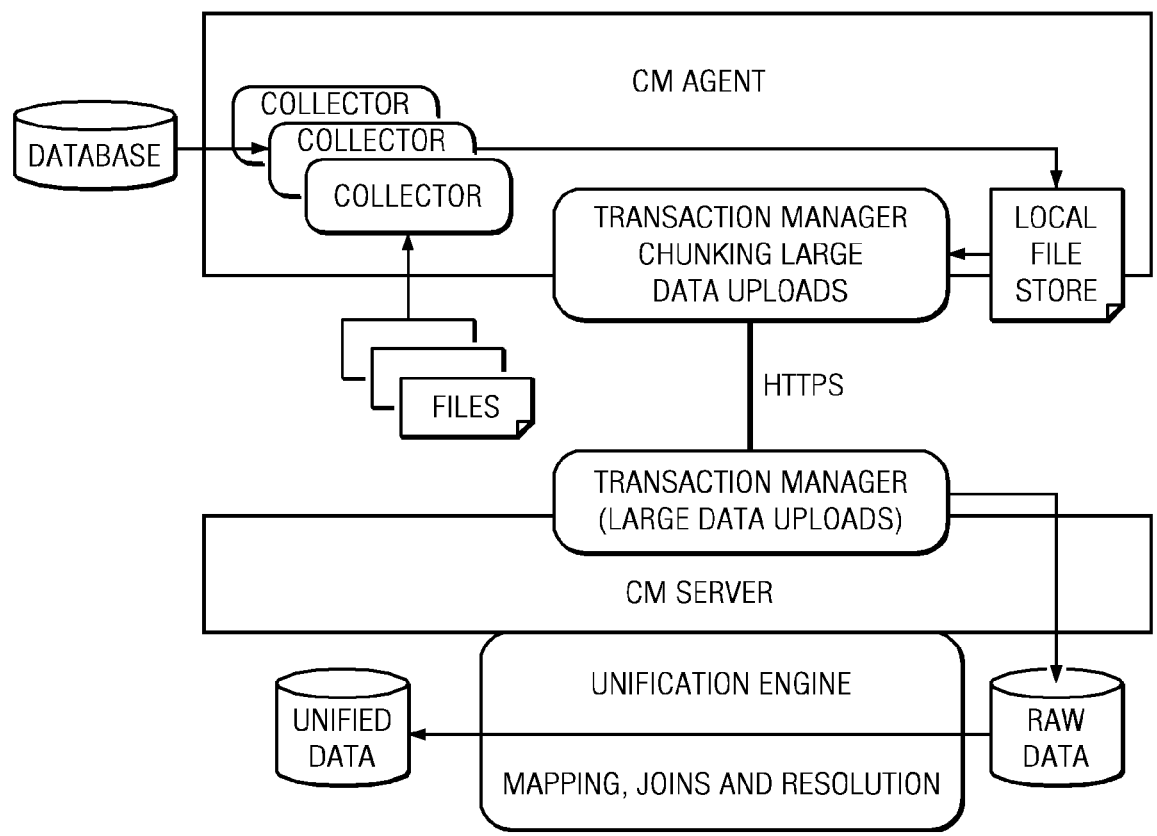
FIG. 9 illustrates how a compliance manager agent communicates with a compliance manager server to collect data for use in creating a unified data view.

As noted above, the collection of raw entitlement data is accomplished by collectors, which typically are software components that are capable of querying for and fetching the entitlement data from enterprise applications. Each collector is capable of collecting the information from within a specific data source or a specific application. Representative collectors include a database collector, a CSV file collector, an SAP collector, a WebLogic collector, and so on. Typically, collectors are managed by agents. FIG. 9 illustrates the technique. An agent is a client-side software component of the compliance manager system. An agent can be deployed on a compliance manager system server machine, or a remote machine. An agent manages the activities of the collectors hosted on it. It coordinates all communication with the server, preferably providing a secure pipe (e.g., over https, a Web service, or the like) to communicate with the compliance manager (CM) server. A CM server typically manages an arbitrary number of agents, with each agent hosting an arbitrary number of collectors. This allows flexibility in defining a deployment topology. An agent provides the facility to transport the collected data to the CM server in an efficient and secure way. Preferably, the collected data is stored on the agent side in encrypted form. When sending large data to the server the agent preferably splits the data into manageable chunks and sends them in smaller packets. The server collates the chunks and merges the data on the server side. A transaction manager component (at each end) facilitates this large file data transfer process.

Figure 10:
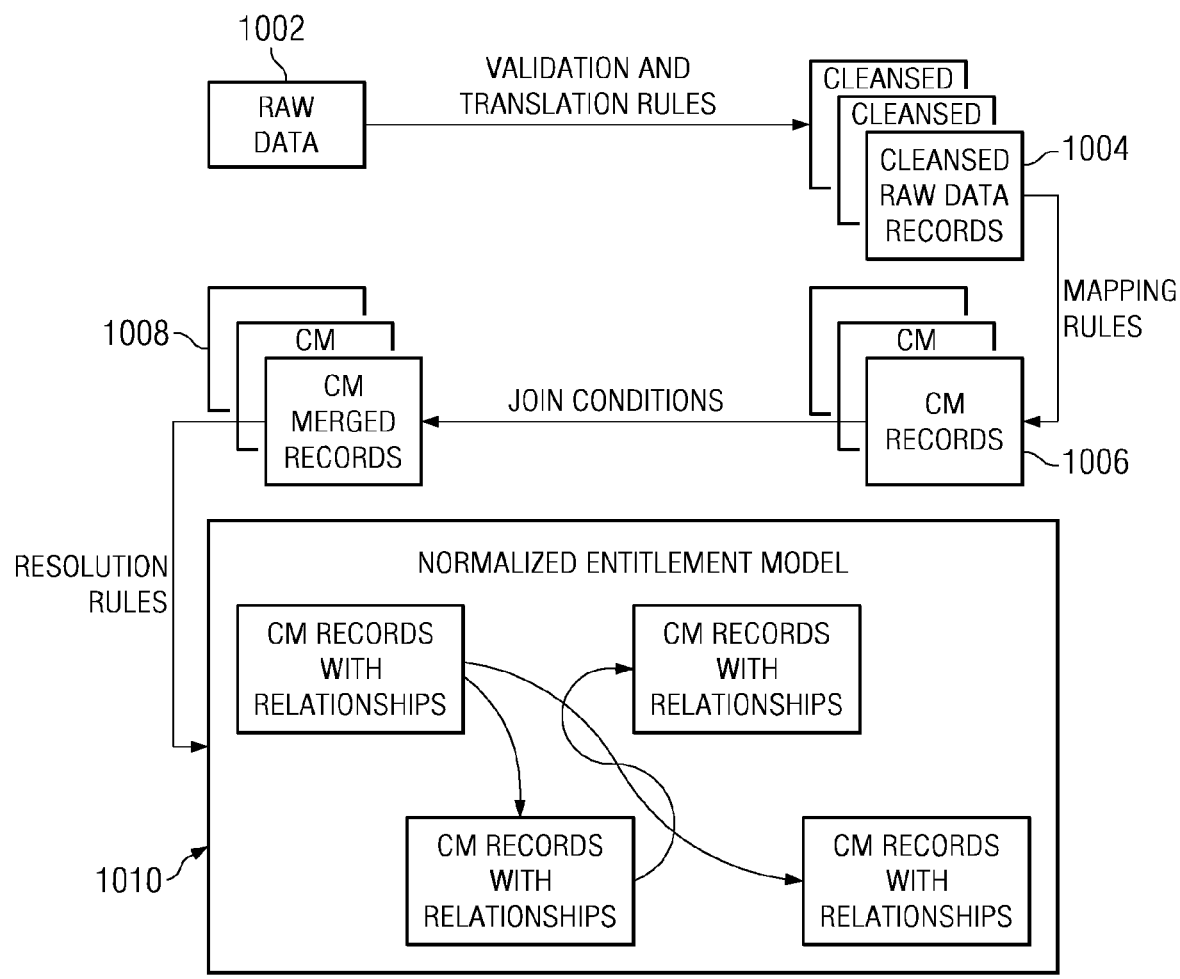
FIG. 10 illustrates a basic process flow of the unification engine.

FIG. 10 illustrates the basic process flow of the unification engine. As noted above, the first step involves collecting the raw data 1002. After applying validation and translation rules, the resulting raw data records are considered to be cleansed. The cleansed raw data records are shown at 1004. Mapping rules are then applied to generate a set of CM records 1006. Thereafter, a set of one of more join conditions are applied to generate a set of CM merged records 1008. By applying a set of resolution rules to the CM merged records, a normalized entitlement model 1010 is created.

Figure 11:
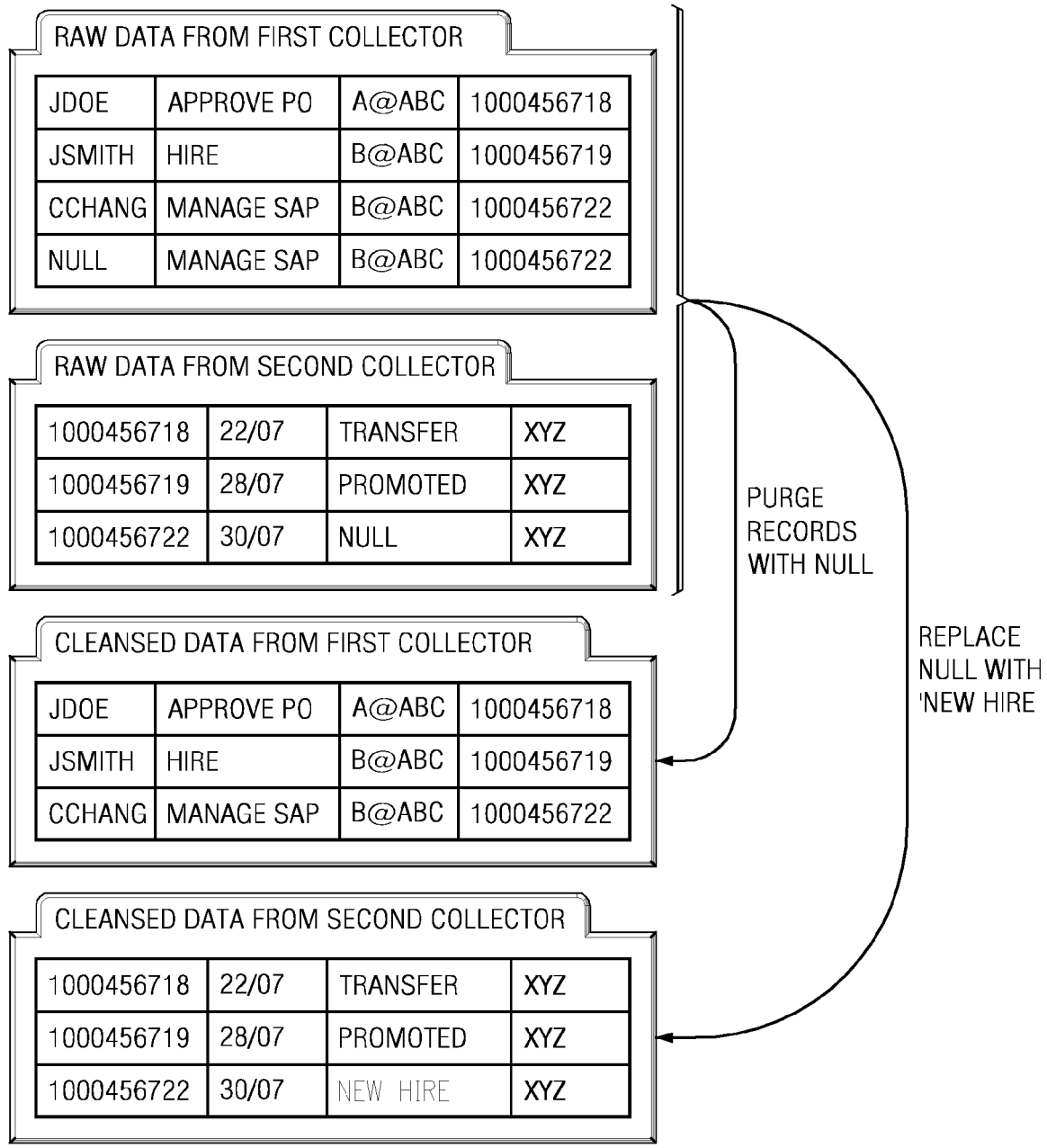
FIG. 11 illustrates a data cleansing process.

FIG. 11 illustrates the data cleansing process.

FIG. 12 illustrates how data is translated (loaded) into the common format, e.g., using column mappings.

Figure 13:
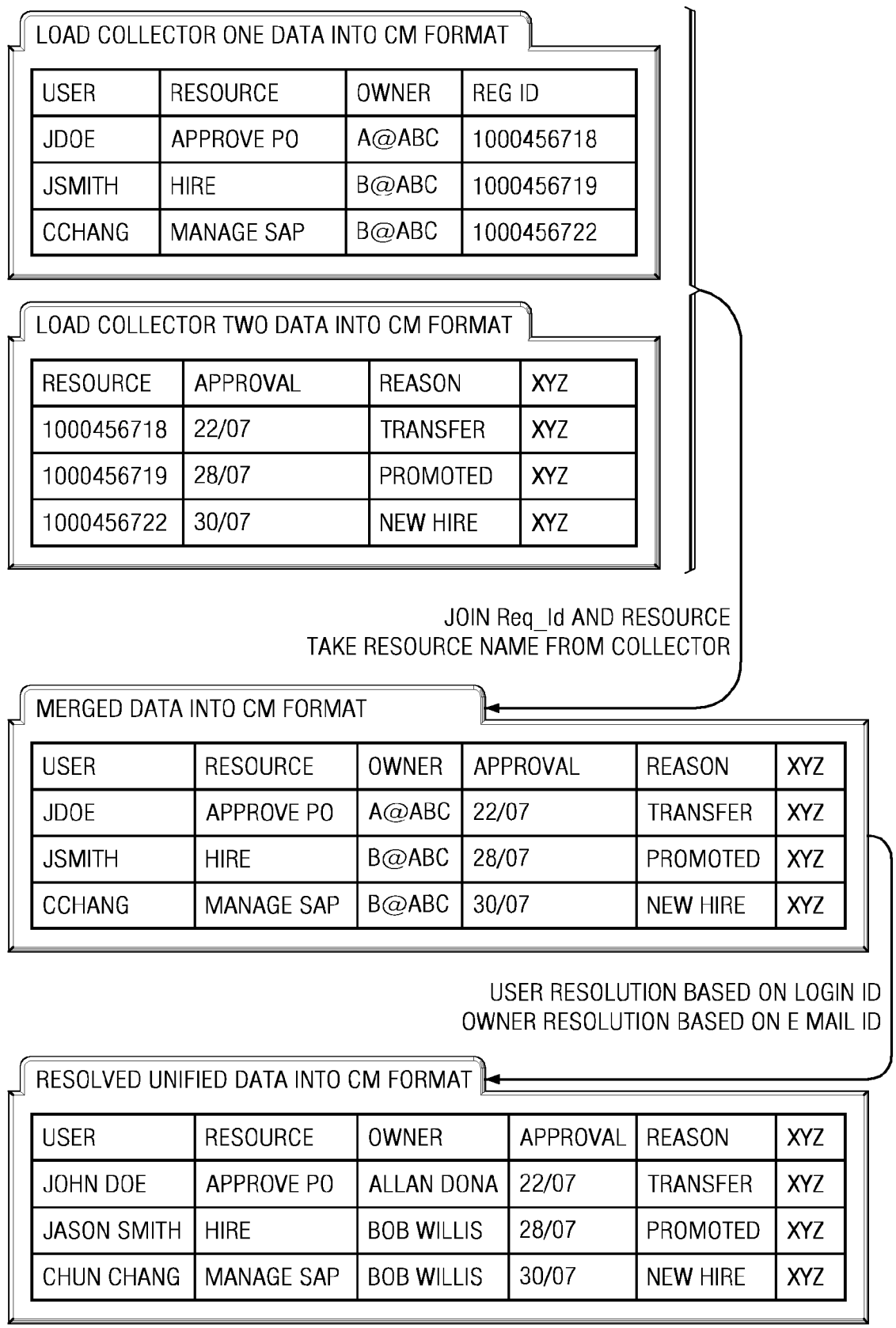
FIG. 13 illustrates joining of records and resolution of references to facilitate creation of a normalized entitlement model.

FIG. 13 illustrates joining of records and resolution of references to create the normalized entitlement model.

The technique shown in FIG. 10 also may be used to create a unified identity model, and a unified activity model.

The following provides additional details of the technique for generating the normalized entitlement model.

As described above, the first step in the process is the collection of the raw data. The collected records are then translated into a standard or "common" format. This processing accomplishes data cleansing, data mapping and data translation. Data cleansing involves checking the validity of data, including data format and data value checks. These rules are provided to guard against using bad data within the system. Some examples of the validation rules are: if the count of resource records is less than a given number (e.g., 300) mark collection as bad; if the change in the entitlement record count from the last collection is greater than a given percentage (e.g., 10%), mark the collection as bad collection; if the value for a collected property is null, populate with the specified value; and so forth. If the collected data meets the requirements for data quality, it is then loaded into a CM system entitlement model. Data mapping specifies how the collected record maps to the record structure of the CM entitlement model. Typically, this step uses mapping information that identifies a column level mapping between the collected record and the CM entitlement model record. The mapping rules specify which columns in the collected data should be loaded into which columns in the entitlement model. During this process of loading data into the CM entitlement model, one more data translation rules may be applied to change the data that is loaded. Data translation involves transforming the collected data prior to populating the CM entitlement model record set. Thus, for example, the raw record may collect the date in the form of a number (milliseconds since Jan. 1, 1970), and the data translation rules may specify the logic for converting this data into the common model date format.

After translation into the common format, the records then are unified to generate an enterprise-wide view of the entitlements. Unification is the process through which the records collected from various collectors are merged and the inter-record relationships resolved to generate an enterprise view of the entitlement data. Unification typically involves three (3) sub-steps: join conditions 810, application of an authoritative attribute specification (AAS) 810, and reference resolution 812. These sub-steps are now described.

In many cases the data for a single record is collected from multiple places. For example, some of the properties (e.g., name, location, and the like) of a resource may come from one collector in a resource record while some other properties (e.g., owner, vendor, or the like) may come from a second collector in a separate resource record. In these cases, it is desired to merge the data from the two records into a single view for the record consisting of all the properties for that record. This merging of records is accomplished by joining the data from multiple records. Preferably, this joining of records is accomplished using joining rules provide by the administrator (or the system) while configuring the unification. The joining rules specify the conditions for merging data from two records. Examples of join rules are: two resource records coming from the same collector can be merged if their names are identical; a resource record coming from collector A is merged with a resource record coming from collector B if the resource_id field from the first record matches the resource_name field from the second record; and so forth. Of course, the above examples are merely illustrative. After evaluating all join conditions, the collected record set is transformed into a unique record set, with all duplicate record sets merged into a single record.

While joining two records it is possible that there will be duplicate values for certain attributes. This can happen if an attribute value is collected by more than one record that is joined. Because an attribute can have only one true value, the join process needs to identify the correct value that should be populated and used in the rest of the processing. Preferably, this decision is made using a configuration provided in the authoritative attribute specification. An authoritative specification is a set of rules that help in resolving conflicts among the collected attribute values. An authoritative attribute may provide a specific collector that should be treated as authoritative source for a given attribute. In addition, it may specify rules that govern the behavior. The following are example rules: on conflict always populate a null/specified value instead of collected value; on conflict move the collected records into the set of bad records; on conflict populate the value that was collected most recently; and so forth. Of course, the above examples are merely illustrative. After application of the authoritative specification, the collected raw data is transformed into a set of unique merged records with correct properties.

The data contained in the entitlement model contains relationships among various record types. For example, a resource record may contain a reference to an application. An application role may contain references to other application roles that are its sub-groups. To generate a completely unified model, typically these relationships need to be resolved and have to be established among the data loaded in the CM entitlement model. This is achieved through an object resolution step in the unification process. Object resolution is accomplished through a set of one or more reference resolution rules. Reference rules can be of multiple types, such as: lookup rules, value map rules, rules based on reference data, and the like. Lookup rules are applicable in cases where the reference contains an attribute of the target record. For example, an application role record may refer to another application role record by its name. In this case, the referred record can be resolved by using a lookup on the name field. Value map rules are applicable when the mapping between the referred value and the object exists externally. For these rules, a mapping table is provided to the rule engine, and the references are resolved using the mapping table. In still other cases, the resolution requires certain rules to be executed on the data. An example of this type of rule is "if the referred application name starts with XA001 then replace the reference with an application named Great Plains." A reference rule can be applied to data from a single collector, or from data collected from multiple collectors. For example, consider a case where an application role refers to its sub-roles by name.

If both the parent and the child roles records are collected by the same collector, then the reference resolution rules are applied to the data from the single collector. If the child record is collected by a different collector, however, then the resolution rule may be applied across the collectors. Thus, the resolution rules allow the system to specify rules within a single collector, across collectors and unified view. Multiple rules can be specified for the resolution of the same attribute. In such cases, preferably the rules are executed in the order provided. The resolution may then stop at the first rule that resolves to a valid object. This is useful in cases where the record may contain different data.

It is possible for some of the references to remain unresolved after all rules have been evaluated. In these cases, preferably a configurable action specification governs the behavior of the system. The actions include, for example: retain the un-resolved references; replace the un-resolved references with null values; move the records with un-resolved references to set of bad records; populate the specific default references when the resolution fails, and so forth. The above examples are merely illustrative.

After the resolution rules are applied, a unified entitlement view of the enterprise is created within CM entitlement model. This view contains data merged from multiple places and the relationships within the data retrieved from multiple places.

As a final step in the entitlement normalization process, it may be desired to verify the unification. Unification verification rules provide a way to identify errors during the unification process. These are a set of rules that are applied on the unified data to check the quality and consistency of the unification process. The following are some example rules or checks: the number of bad records generated during unification process must be less than a given number (e.g. 100); the number of unresolved references in the unified data must be less than a given number (e.g., 50); The change in the count of unified entitlement records from the last unification must be less than a given percentage (e.g. 10%), and so forth. These rules help in catching unexpected data changes resulting in bad configurations.

The system preferably models entitlements using resources and actions. In this approach, an entitlement is associated with an application and is described using a named action on a named resource. In particular, an <Entitlement> is a reference to an <Application>, <ResourceDescriptor>, <ActionDescriptor> tuple. For example,

```
Entitlement = {
Application = "Ariba"
ResourceDescriptor = "PurchaseOrder"
ActionDescriptor = "Approve"
}
```

Note that both resources and actions may be described using a set of attributes. For example,

```
Entitlement = {
Application = "Ariba"
ResourceDescriptor = "PurchaseOrder", "IT-Hardware", "Telecom"
ActionDescriptor = "Approve", "Sign"
}
```

Regardless of whether a target application uses ACLs, policies or roles-based authorization, the system preferably attempts to resolve user-entitlement bindings in terms of "user-resource-action" bindings, prior to saving the bindings in its data mart. Both coarse-grained entitlements (e.g. entitlements to application URLs) and fine-grained entitlements (e.g. entitlements to resources reachable only after access to an application URL has been authorized) are supported. The data mart saves both raw entitlement data as obtained from application collectors, as well as normalized entitlement records. Thus, if a user has a specific role with respect to an application, the system is cognizant of both the role, as well as the specific entitlements (including the details of resources and actions) associated with the role.

When a collector is developed for a new application, metadata may be created that describes the entitlements associated with the application. Depending on the application, this metadata may be required to normalize the entitlement data obtained at run time from application collectors, and organize it appropriately. For example, an application may be designed to recognize an application-specific role called "Supervisor" with five associated entitlements. If the entitlement retrieval interface for this application returns the user-entitlement binding "JohnDoe is a Supervisor," knowledge of the five entitlements associated with the "Supervisor" role is required for normalization (so that user-resource-action bindings can be saved in the data mart).

When data obtained at runtime references organizational units, groups or attribute value assertions (e.g. all members of the group EmployeesAD.Finance can sign Ariba Purchase orders, or all members of the EmployeesAD.FinanceManagers group who have the EmployeesAD.Location attribute set to USA can sign Ariba purchase orders), these user specifications preferably are enumerated to determine the specific users who have the entitlement. Entitlements that have real-time constraints associated with them (e.g. the TransferFunds entitlement may be given to all Customers who have a current balance in excess of $1000) are challenging to evaluate because connectivity to additional data sources may be required to evaluate the real-time constraint. Further, an evaluation done at a specific point in time cannot guarantee accuracy with respect to a different time. Preferably, the system supports evaluation of real-time constraints, e.g., that are based on attributes in LDAP user directories. Other constraints, however, may not be evaluated and are preserved unresolved, in attribute format as part of a user-entitlement binding. For example, a time constraint (e.g. an entitlement valid between 9 am and 5 pm for example) is preserved as a constraint attribute in a user-entitlement binding. The system also preferably evaluates real-time constraints based on configured queries to data sources (e.g. those reachable by JDBC) other than user directories.

Because user entitlements are constantly changing, the system preferably uses the concept of entitlement snapshots for analysis purposes. Each Business Process has its own current entitlement snapshot; the most recently fetched entitlement data for all applications within a Business Process is included in the current snapshot for the Business Process. The period between snapshot collections is configurable. Entitlement snapshots are time-stamped and versioned to support historical analysis. Historical snapshots are saved for a configurable time period.

An entitlement collector should be configured with methods for retrieving entitlements at runtime as well as metadata for mapping retrieved data into the normalized format. Runtime entitlements obtained from a target application represent user-entitlement bindings. Bindings, either explicitly or implicitly, include a user reference and an entitlement reference. The following provides additional details regarding entitlement references.

A collector may get any of the following entitlement references at runtime and should be able to map it to the system model: reference to a resource-action tuple in terms of data strings; reference to a set of entitlements; reference to a single entitlement string; reference to a typed resource with implicit actions that depend on the resource type; no entitlement reference. Also, preferably the system supports the following user references matched with one of the entitlement references listed above: reference to a DN; reference to a group object in the identity store; reference to an attribute value assertion; reference to a role object in the directory, and others.

Activity and Transactions

The collectors collect records from audit logs and audit trails from target applications on a periodic basis, as configured by the administrator. In developing a collector for a new application, metadata is created that describes the log record types for the application. The metadata for a log record defines a logged event in terms of a source identifier (identifying the source that logged or reported the event), an event or transaction type (identifying the event type or transaction category), a user identifier ("who invoked the transaction"), a transaction ("what was done") and a timestamp ("when the event occurred").

An <Event> is defined as a <Source>,<TransactionType>, <User>,<Transaction>,<TimeStamp> tuple. A <Transaction> is a reference to an <Application>,<ResourceDescriptor>,<ActionDescriptor> <Parameters> tuple, where resources and actions are described using a hierarchy of attributes.

The system preferably tracks source strings, transaction types, resource descriptors, action descriptors and transaction-specific parameters to enable correlation and analysis at a granular level whenever possible. Resource-action combinations found in log records that match resource-action combinations in entitlements allow for correlation at the individual resource and/or action level. Further, correlation or filtering across log records based on specific known parameter values may be provided.

The system creates one or more entitlement reports. These include, for example, a report showing the resources accessible to a unified identity that matches a user specification filter, a report showing resources accessible to a unified identity per application or set of applications (see FIG. 9 for an example), a report showing the differences in the resources accessible to a DN or unified identity given various time markers, and many others. A report typically is made up of two components, a base query and an initial format for display of the query's results. Preferably, the system includes several "templates" for reports that provide the basic reporting functionality referenced throughout this document, each categorized as being of a particular type. To enable accurate and consistent authorization for reports, the system preferably identifies a security context or scope of data the report will produce when run.

The subject matter described herein provides numerous advantages. As companies strive for sustainable, cross-regulatory compliance, the described subject matter provides a system and method that helps an enterprise move toward those goals by: 1) identifying access-related controls that meet the requirements of several regulations, 2) automating the monitoring of these controls, and 3) automating the compliance tasks associated with them. To accomplish this, the described system enables companies to achieve the following objectives:

Know Who Has Access To What and When

With the system, organizations get a unified view of users who access enterprise resources, the entitlements that they have to those resources and user activity. As has been described, by using collectors, the system collects information from applications and other IT resources, across mainframe, midrange, web and PC environments, normalizes this data, correlating user, entitlements, and activity information in the process. The system identifies and reports on issues like separation of duties violations, inappropriate entitlement assignments, or status of entitlements for terminated employees, among many others.

Proactively Identify Risks

The system monitors changes in user entitlements and analyzes user activities. Automatic notification of key changes or suspicious activities raises visibility quickly to minimize business impact.

Automate The Compliance Process

The system provides a built-in workflow for exception handling, assessment scheduling and approval routing, and this workflow enables an automated process that links compliance tasks to resource owners and approvers. This functionality integrates compliance into the fabric of the organization while ensuring accountability.

Have Visibility Into and Measure Their State of Compliance

The system provides a continuous and comprehensive view into an organization's state of access compliance. Individual managers can have customized views of key metrics including who owns what issues, how long the issues have been open, and the time it takes to resolve issues.

As has been described above, the system preferably uses an open architecture that easily integrates with a business's IT environment. It can operate independently or with existing corporate risk, governance or identity management systems.

The system enables organizations to gain enterprise-wide visibility into all user entitlements and roles, to monitor who has access to what, how they got it and who approved it, to make business managers accountable for reviewing who should have access, to manage and audit all entitlement changes through integration with enterprise-wide access enforcement and user provisioning infrastructure, and to determine whether policy and control objectives have been met and provide evidence of compliance.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the present invention. A given machine includes network interfaces and software to connect the machine to a network in the usual manner. The present invention may be implemented as a standalone product, or as a managed service (e.g., in an ASP model) using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the product or service may be implemented in a standalone server, or across a distributed set of machines. Typically, a server connects to the publicly-routable Internet, a corporate intranet, a private network, or any combination thereof, depending on the desired implementation environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

What is claimed is:

1. Apparatus, comprising:
   a processor;
   computer memory holding computer program instructions that when executed by the processor manage user entitlements within an enterprise by:
   receiving a data set collected from each of a set of applications within the enterprise, the set of applications running on a set of servers coupled to the apparatus over a network, wherein each data set is associated with a user's entitlements with respect to the application and represents the user's entitlements in an application-specific format that differs from application-specific formats of other data sets received from other applications, at least one data set including metadata that specifies rules for expressing the respective data set in a normalized format and rules for resolving conflicts in attributes;
   transforming each data set that meets a requirement for data quality into a record structure associated with an enterprise entitlement model; and
   unifying the transformed data sets to create and store, in a data store, a unified view of the user's entitlements within the enterprise that is complete and correlated across users, entitlements, roles and resources in the normalized format, by the following sub-steps:
      merging two or more data records from different ones of the set of applications in different application-specific formats in accordance with the rules specified in the metadata for the at least one data set;
      resolving any conflict in an attribute associated with the merged data records using the metadata from the data set to unify join conditions, authoritative attributes defined by the metadata, and reference resolution rules, the authoritative attributes defined by the metadata specifying an application whose attribute takes precedence when corresponding attributes received from different applications differ;
      resolving any conflict in an application reference associated with the merged data records;
      identifying whether an error occurring during the unifying operation violates a unification verification rule; and
      accepting the unified view if the error occurring during the unifying operation does not violate the unification verification rule.

2. The apparatus as described in claim 1 wherein the data set is collected from an application in the set of applications periodically.

3. The apparatus as described in claim 1 wherein the merging sub-step uses a join rule.

4. The apparatus as described in claim 1 wherein the sub-step of resolving any conflict in the attribute uses an authoritative attribute specification.

5. The apparatus as described in claim 1 wherein the sub-step of resolving any conflict in the attribute uses a rule.

6. The apparatus as described in claim 1 wherein the sub-step of resolving any conflict in an application reference uses a rule.

7. The apparatus as described in claim 6 wherein the rule is one of: a lookup rule, a value map rule, and a rule based on reference data.

8. The apparatus as described in claim 1 wherein the unifying step further include verifying at least one of the merging and resolving sub-steps.

9. The apparatus as described in claim 1 further including performing an entitlement analysis on the unified view.

10. The apparatus as described in claim 9 further including creating a unified view of the user.

11. The apparatus as described in claim 1 wherein the merging of two or more data records is accomplished by joining the data from multiple records from multiple locations into a single unified record.

12. Apparatus, comprising:
    a processor;
    computer memory holding computer program instructions that when executed by the processor manage given data within an enterprise by:
    receiving a data set collected from each of a set of applications within the enterprise, the set of applications running on a set of servers coupled to the apparatus over a network, wherein each data set is associated with the application and represents a user's entitlements in an application-specific format that differs from application-specific formats of other data sets received from other applications, at least one data set including metadata that specifies rules for expressing the respective data set in a normalized format and rules for resolving conflicts in attributes;
    transforming each data set that meets a standard for data quality into a record structure associated with an enterprise model;
    unifying the transformed data sets to create and store, in a data store, a unified view that is complete and correlated across users, entitlements, roles and resources in a normalized format, the unified view having a business-specific attribute associated therewith for a subset of users who share a specified risk profile, the unified view created by the following sub-steps:
       merging two or more data records from different ones of the set of applications in different application-specific formats in accordance with the rules specified in the metadata for the at least one data set;
       resolving any conflict in an attribute associated with the merged data records using the metadata from the data set to unify join conditions, authoritative attributes defined by the metadata, and reference resolution rules, the authoritative attributes defined by the metadata specifying an application whose attribute takes precedence when corresponding attributes received from different applications differ;

resolving any conflict in an application reference associated with the merged data records; and processing any un-resolved application reference according to a configuration action; and performing a compliance analysis on the unified view;

wherein the given data is one of identity data, entitlement data and activity data.

13. The apparatus as described in claim 12 wherein the compliance analysis is an entitlement analysis.

14. The apparatus as described in claim 12 wherein the merging of two or more data records includes joining the data from multiple records from multiple locations into a single unified record.

* * * * *